US012804487B2

(12) United States Patent
Hmimy et al.

(10) Patent No.: US 12,804,487 B2
(45) Date of Patent: Nov. 17, 2026

(54) WIRELESS SIGNAL MONITORING AND CONNECTION CONTROL

(71) Applicant: Charter Communications Operating, LLC, St. Louis, MO (US)

(72) Inventors: Hossam H. Hmimy, Aurora, CO (US); Manish Jindal, Lone Tree, CO (US); Mohamed Daoud, Englewood, CO (US); Muhammad J. Khan, Aurora, CO (US); Gary S. Koerper, Castle Pines, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 400 days.

(21) Appl. No.: 18/223,566

(22) Filed: Jul. 19, 2023

(65) Prior Publication Data

US 2025/0031113 A1 Jan. 23, 2025

(51) Int. Cl.
*H04W 36/00* (2009.01)
*H04W 84/12* (2009.01)

(52) U.S. Cl.
CPC ........ *H04W 36/0085* (2018.08); *H04W 84/12* (2013.01)

(58) Field of Classification Search
CPC ...................... H04W 36/00–385; H04W 84/12
See application file for complete search history.

(56) References Cited

U.S. PATENT DOCUMENTS

2011/0299446 A1* 12/2011 Chun ................ H04W 36/0016 370/331
2021/0289413 A1* 9/2021 Files ..................... H04W 4/027
2022/0045909 A1* 2/2022 Henry ................... H04W 24/02

* cited by examiner

*Primary Examiner* — Ronald Eisner
(74) *Attorney, Agent, or Firm* — Armis IP Law, LLC

(57) ABSTRACT

A wireless system as discussed herein includes a mobile communication device. The mobile communication device transmits first wireless communications over a first wireless communication link to a first wireless access point. The mobile communication device receives a notification such as from the first wireless access point. The notification indicates power information associated with the first wireless access point receiving wireless communications from the mobile communication device. The wireless communications over the first wireless communication link are encoded in accordance with a first wireless communication protocol. A connection management resource associated with the mobile communication device controls handoff of the mobile communication device from the first wireless access point to a second wireless access point based on the notification. The second wireless access point supports communication with the mobile communication device via a second wireless communication protocol.

24 Claims, 17 Drawing Sheets

ESTIMATED LINK PERFORMANCE BASED ON OFFSET

171

RSSI

| UE DEVICE ID | TIME STAMP | UL SIGNAL STRENGTH (dBm) | UL ID | SNR (dB) |
|---|---|---|---|---|
| ⋮ | ⋮ | ⋮ | ⋮ | ⋮ |
| UE 111 | T11 | -35 | 128-1 | 15 |
| UE 125 | T21 | -55 | 178-1 | 45 |
| ⋮ | ⋮ | ⋮ | ⋮ | ⋮ |

FIG. 2

ESTIMATED LINK PERFORMANCE BASED ON OFFSET

471

525

| UE DEVICE ID | TIME STAMP | DL SIGNAL STRENGTH (dBm) | UL SIGNAL STRENGTH (dBm) | OFFSET (dB) |
|---|---|---|---|---|
| UE 111 | T10 | -65 | -75 | -10 |
| UE 121 | T11 | -51 | -56 | -5 |
| UE 125 | T21 | -59 | -66 | -7 |
| ⋮ | ⋮ | ⋮ | ⋮ | ⋮ |

FIG. 5

771

| UE DEVICE ID | TIME STAMP | UL SIGNAL STRENGTH (dBm) | UL ID | SNR (dB) |
|---|---|---|---|---|
| ⋮ | ⋮ | ⋮ | ⋮ | ⋮ |
| UE 121 | T11 | -35 | 128-1 | 15 |
| UE 125 | T21 | -55 | 178-1 | 45 |
| ⋮ | ⋮ | ⋮ | ⋮ | ⋮ |

FIG. 8

1071

| UE DEVICE ID | TIME STAMP | UL SIGNAL STRENGTH (dBm) | UL ID | SNR (dB) |
|---|---|---|---|---|
| ⋮ | ⋮ | ⋮ | ⋮ | ⋮ |
| UE 121 | T11 | -35 | 128-1 | 15 |
| UE 125 | T21 | -55 | 178-1 | 45 |
| ⋮ | ⋮ | ⋮ | ⋮ | ⋮ |

FIG. 11

771-1

RSSI

| UE DEVICE ID | TIME STAMP | UL SIGNAL STRENGTH (dBm) | UL ID | SNR (dB) |
|---|---|---|---|---|
| ⋮ | ⋮ | ⋮ | ⋮ | ⋮ |
| UE 111 | T11 | -14 | 128-1 | 15 |
| UE 125 | T21 | -55 | 178-1 | 45 |
| ⋮ | ⋮ | ⋮ | ⋮ | ⋮ |

771-2

RSSI

| UE DEVICE ID | TIME STAMP | UL SIGNAL STRENGTH (dBm) | UL ID | SNR (dB) |
|---|---|---|---|---|
| ⋮ | ⋮ | ⋮ | ⋮ | ⋮ |
| UE 111 | T11 | -44 | 128-1 | 21 |
| UE 126 | T25 | -51 | 188-1 | 23 |
| ⋮ | ⋮ | ⋮ | ⋮ | ⋮ |

FIG. 14

HANDOFF FROM
WAP 121 AND/OR WAP 122 TO WBS 131

WIRELESS SIGNAL MONITORING AND CONNECTION CONTROL

BACKGROUND

Conventional communication devices and corresponding operating systems typically include a have connection manager that selects connectivity to Wi-Fi™ or cellular networks. Even when Wi-Fi™ performance is less than optimal and availability of cellular access is good, the mobile communication device will select the communication device to a Wi-Fi™ access point rather than connect to a corresponding cellular network. In certain instances, users will have to manually turn off Wi-Fi™ to switch over to the cellular network.

Apple™ IoS introduced a so-called "WiFi assist" in IOS9 where it connects the communication device to both cellular and Wi-Fi™. The assist function automatically switches to cellular use when Wi-Fi™ is totally off (Wi-Fi™ performance is extremely low). The assist works when you have apps running in the foreground.

Android™ "Wi-Fi Assist" is a smart feature that monitors connections (such as uplink and downlink speeds) and uses a processing function to automatically switch a wireless Internet connection from Wi-Fi™ to mobile data (cellular) in areas with poor or weak Wi-Fi™ signals depending on the signal strength and quality.

As an over-the-top solution, Speedify™ can be downloaded on Android™ and iOS™ devices. It works in the background of your communication device, constantly monitoring the quality of your wireless connections. It uses channel bonding technology to create a unified connection with your cell signal and your Wi-Fi™. Speedify™ can be configured to prioritize Wi-Fi™. Speedify™ will then use Wi-Fi™ as much as possible, keeping costs associated with wireless services quite low. Such as an application typically will only use data (cellular) as a bridge or backup to keep the communication device connected to the Internet when Wi-Fi™ fails or the user changes use of wireless networks. When a Wi-Fi™ network does fail, Speedify™ automatically reconnects as soon as it is back online.

BRIEF DESCRIPTION OF EMBODIMENTS

As discussed herein, a wireless system provides improved implementation of wireless access networks and novel use of wireless bandwidth.

For example, a mobile communication device transmits first wireless communications over a first wireless communication link to a first wireless access point. The mobile communication device receives a notification such as from the first wireless access point or other suitable entity. The notification indicates power information associated with the first wireless access point receiving wireless communications from the mobile communication device. The wireless communications between the mobile communication device and the first wireless access point are encoded in accordance with a first wireless communication protocol. A communication management resource such as associated with the mobile communication device controls handoff of the mobile communication device from the first wireless access point to a second wireless access point based on the notification (such as power level of the first wireless access point receiving the communications from the mobile communication device). The second wireless access point supports wireless communications with the mobile communication device via a second wireless communication protocol.

Accordingly, the user equipment (i.e., the mobile communication device) initiates handoff from the first wireless access point to the second wireless access point depending on a detected magnitude of the first wireless access point receiving the communications from the user equipment.

In accordance with further examples, the communication management resource associated with the mobile communication device initiates a handoff of the mobile communication device from the first wireless access point to the second wireless access point in response to detecting that the power level as indicated by the power information is below a threshold level indicating a poor performance of the communication link.

In accordance with still further examples, the first wireless access point resides in a Wi-Fi™ network (first wireless communication protocol); the second wireless access point resides in a cellular-based wireless network (second wireless communication protocol).

In further examples, a first wireless communication link between the mobile communication device and the first wireless access point utilizes an unlicensed bandwidth to support first communications; a second wireless communication link between the mobile communication device and the second wireless access point utilizes a licensed bandwidth to support second communications.

The mobile communication device can be configured to provide wireless connectivity control. For example, the mobile communication device as discussed herein can be configured to implement a client function in the mobile communication device. The client function can be in communication with a power management resource through the first wireless access point to receive the notification of wireless power level associated with the first wireless access point receiving wireless communications from the first wireless access point.

The one or more power management resource as discussed herein can be located at any suitable location. For example, the power management resource may reside in the first wireless access point. The power management resource may reside at a disparate location with respect to the first wireless access point. The mobile communication device can be configured to receive the power level notification via a message transmitted from the power management resource through the first wireless access point to the mobile communication device.

If desired, power information received at the mobile communication device may include an offset value indicating a difference between: i) a first wireless power of the first wireless access point receiving uplink wireless signals transmitted from the mobile communication device and ii) a second wireless power of the mobile communication device receiving downlink wireless signals transmitted from the first wireless access point to the mobile communication device. In accordance with further examples, the mobile communication device estimates an uplink power level of the first wireless access point receiving the first wireless communications via the offset value and a wireless power level of the mobile communication device receiving wireless signals from the first wireless access point. Additionally, or alternatively, the mobile communication device receives the power information including the offset value in response to a condition in which the offset value is below a threshold level.

In further examples, the mobile communication device receives the notification in response to the mobile communication device calling, through the first wireless access point, an application programming interface at a server resource.

In accordance with further examples, the notification as previously discussed herein is a first notification. The mobile communication device can be configured to transmit second wireless communications over a second wireless communication link to a third wireless access point. The mobile communication device receives a second notification from the second notification indicating power information associated with the third wireless access point receiving wireless communications from the mobile communication device in accordance with the first wireless communication protocol. The mobile communication device controls handoff of the mobile communication device from the first wireless access point to the second wireless access point or the third wireless access point based on the first notification and the second notification.

Techniques as discussed herein are useful over conventional techniques. For example, one or more implementation of a communication management resource and corresponding operations as discussed herein enable a respective mobile communication device to make better decisions regarding a handoff to another wireless access point supporting a second wireless communication protocol.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium or any computer readable hardware storage medium on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: transmit first wireless communications over a first wireless communication link to a first wireless access point; receive a notification from the first wireless access point or other suitable entity, the notification indicating power information associated with the first wireless access point receiving wireless communications from the mobile communication device, the wireless communications encoded in accordance with a first wireless communication protocol; and control handoff of the mobile communication device from the first wireless access point to the second wireless access point based on the notification, the second wireless access point supporting communications with the mobile communication device via a second wireless communication protocol.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating tracking of link conditions as discussed herein.

FIG. 5 is an example diagram illustrating tracking of link conditions as discussed herein.

FIG. 8 is an example diagram illustrating tracking of link conditions as discussed herein.

FIG. 11 is an example diagram illustrating tracking of link conditions as discussed herein.

FIG. 14 is an example diagram illustrating tracking of link conditions as discussed herein.

Figure 1:
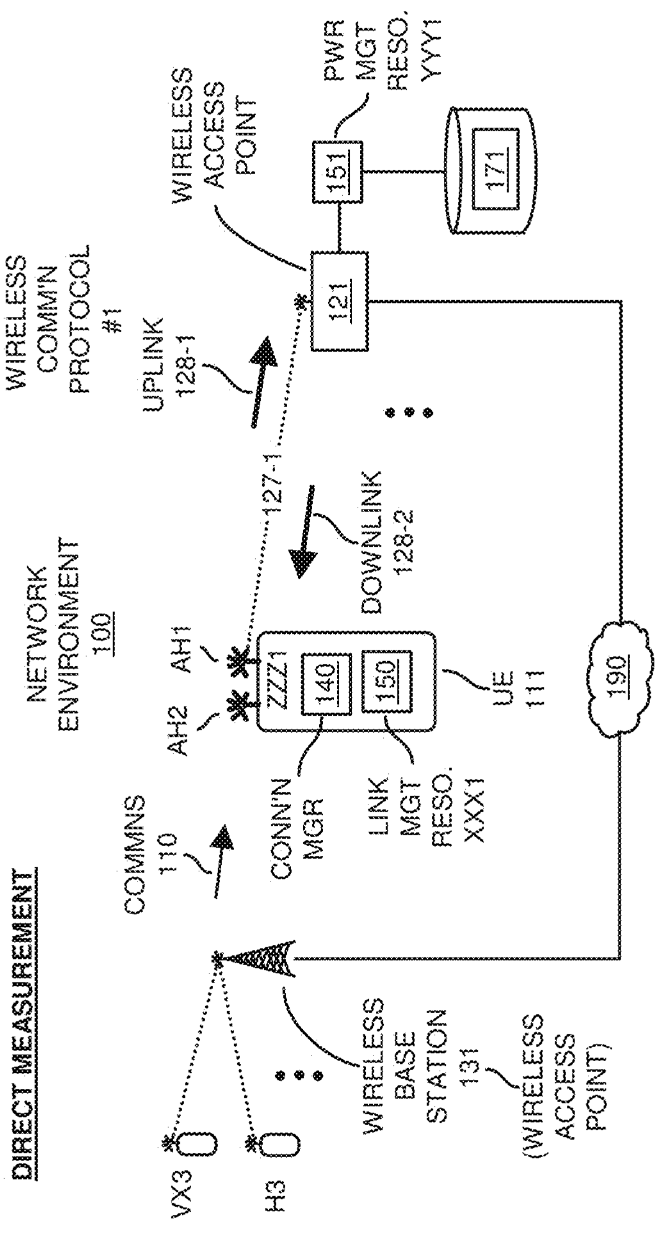
FIG. 1 is an example diagram illustrating a network environment and implementation of communication link monitoring and handoff management as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

Techniques as discussed herein include a communication device and link management function operative to communicate first wireless communications from the mobile communication device to a first wireless access point. In response to communicating the first wireless communications, the communication device receives a notification from the first wireless access point. The notification indicates power information associated with the first wireless access point receiving wireless communications from the mobile communication device. The power information may indicate a power level at which the first wireless communications or received by the first wireless access point. The first wireless communications between the mobile communication device and the first wireless access point are encoded in accordance with a first wireless communication protocol. The link management resource (a.k.a., communication management resource) such as associated with the mobile communication device controls handoff of the mobile communication device from the first wireless access point to a second wireless access point based on the notification. For example, if the power level at which the first wireless communications are received by the first wireless access point is below a respective threshold level, the communication management resource initiates handoff of the communication device from the first wireless access point of the second wireless access point. The second wireless access point supports wireless communications with the mobile communication device via a second wireless communication protocol.

Figure 3:
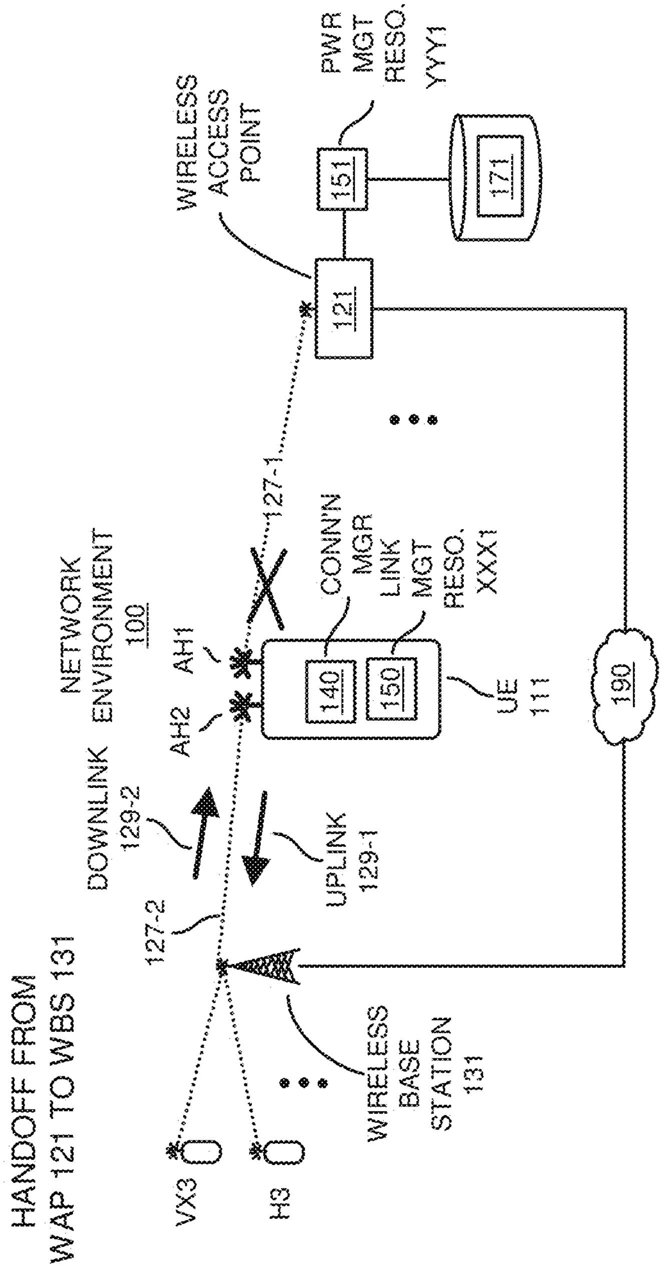
FIG. 3 is an example diagram illustrating handoff of a respective communication device from a first wireless station to a second wireless station depending on link conditions as discussed herein.

Direct Wireless Power Measurement FIGS. 1-3

FIG. 1 is an example diagram illustrating a network environment and implementation of communication link monitoring and handoff management as discussed herein.

As shown in FIG. 1, the network environment 100 includes wireless base station 131 (a.k.a., a wireless access point), wireless access point 121, user equipment 111, link management resource 150 associated with the user equipment 111, power management resource 151 associated with the first wireless access point 121, and connection management resource 140 (a.k.a., a communication management resource associated with user equipment 111).

Note that each of the components/resources in network 100 can be implemented in any suitable manner. For example, wireless base station 131 (a.k.a., wireless access point) can be implemented as wireless base station hardware, wireless base station software, or a combination of wireless base station hardware and wireless base station software; wireless access point 121 can be implemented as wireless access point hardware, wireless access point software, or a combination of wireless access point hardware and wireless access point software; user equipment 111 (a.k.a., mobile communication device) can be implemented as user equipment hardware, user equipment software, or a combination of user equipment hardware and user equipment software; connection management resource 140 can be implemented as connection management hardware, connection management software, or a combination of connection management resource hardware and connection management software; link management resource 150 can be implemented as link management hardware, link management software, or a combination of link management hardware and link management software; link management resource 151 can be implemented as link management hardware, link management software, or a combination of link management hardware and link management software; and so on.

Note further that the connection management resource 140 (a.k.a., communication management resource or native function to control use of uplink power information to control handoff) and corresponding link management resource 150 associated with the user equipment 111 can be co-located or disparately located with respect to each other.

The power management resource 151 can be co-located or disparately located with respect to the first wireless access point 121.

In this example, the user equipment 111 includes link management resource 150 (such as a client application) assigned a corresponding network address XXX1. As its name suggests, the connection management resource 140 controls wireless connectivity of the user equipment 111 to a respective wireless access point amongst multiple wireless access points present in the network environment 100.

As further shown in this example, the user equipment 111 includes first antenna hardware AH1 that supports wireless connectivity with wireless access points in network environment 100 supporting a first wireless communication protocol (such as wireless application protocol #1); the user equipment 111 includes a second antenna hardware AH2 that supports wireless connectivity with wireless access points (wireless base stations in a cellular network) in network environment 100 supporting a second wireless communication protocol (wireless communication protocol #2). In certain instances, the same antenna hardware associated with the user equipment 111 may be used to support wireless communications via the first wireless communication protocol and the second wireless application protocol.

The wireless base station can be configured to transmit messages 110 indicating presence of the wireless base station 131 to the user equipment 111. A magnitude of the power of the user equipment 111 receiving the communications can be used as a factor of whether the user equipment 111 switches over to communicating with the wireless base station 131 to access the remote network 190.

Note that the wireless downlink power of the user equipment 111 (mobile communication device) receiving transmitted downlink communications 128-1 from the wireless access point 121 to the user equipment 111 may be 2-4 times (or even more such as 10 times) greater than the wireless power level of the wireless access point 121 receiving the uplink communications 128-1 transmitted from the user equipment 111. In such an instance, measurement of a power level of wireless communications received at the user equipment 111 from the first wireless access point 121 itself does not provide a good indication of how well the corresponding first wireless access point 121 receives wireless communications from the user equipment 111.

As previously discussed, the user equipment 111 can be configured to include a link management resource 150 (a.k.a., connection management resource). The link management resource 150 can be configured to control whether the user equipment 111 (such as a smart phone) is to remain connected to the first wireless access point 121 or switch over to a second wireless access point (i.e., wireless base station 131) because the link quality associated with the first wireless communication link 127-1 is deemed to be poor. The client-server relationship between the link management resource 150 (client) of the user equipment 111 and the power management resource 151 (server) supports conveyance of network addressed communications regarding wireless power reception levels facilitating as-needed and beneficial handoff of the user equipment 111 from the wireless base station 131 or vice versa.

Thus, the user equipment 111 can be configured to include link management resource 150 (such as a preloaded client application) that is in communication with the power management resource 151 associated with the first wireless access point 121 via the wireless communication link 127-1. The link management resource 150 assigned network address XXX1 can be configured to transmit a query (with source network address of XXX1 and destination network address of YYY1). The link management resource 150 is operative to: i) via communications communicated from the wireless access point 121 to the user equipment 111, receive power information from the power management resource 151 (such as a server associated with the wireless access point 121), ii) decode and acknowledge with status and time stamp reception of data, iii) forward the receive UL data/communications to the communication management resource 140 associated with the operating system of the user equipment 111, and iv) provide recommendation whether to switch operation of the user equipment 111 from Wi-Fi™ (wireless communication protocol #1) to cellular (wireless communication protocol #2) with a timestamp.

The power management resource 151 (such as assigned network address YYY1) associated with the wireless access point 121 collects RF measurements (such as wireless power levels) of receiving wireless uplink communications 128-1 and builds a table 177 for each communication device wirelessly connected to the wireless access point 121. The corresponding table 171 and stored information is shown in FIG. 2.

Referring again to FIG. 1, the wireless access point 121 can be configured to include power management resource 151 (such as including a server/data processing resource) to: i) collect and process the wireless power levels associated with receiving wireless communications 128-1; ii) based on historic power level data, build an UL performance threshold, iii) update the threshold based on any operator input data/command and/or historic data, iv) send status information associated with the collected power level data to the cloud for operator O&M, v) detect occurrence of wireless power level associated with uplink communications 128-1 being below a respective threshold level, vi) apply timestamps to the power level information, encode and transmit the power level information in table 171 as wireless communications (notifications in downlink communications 128-2) transmitted to the link management resource 150, and so on.

In response to a respective condition in which the power level associated with uplink wireless communications 128-1 is detected as falling below a respective threshold level within a predefined hysteresis, the power management resource 151 or other suitable entity transmits a respective notification (via communications 128-2) over the wireless communication link 127-1 to the link management resource 150 at network address XXX1. In one example, the notification is sent based on a trigger condition of detecting that the power level is less than the threshold level as previously discussed. Alternatively, the link management resource can be configured to receive power level information and determine that the corresponding power of the wireless access point 121 receiving communications 128-1 is below a respective threshold level.

Upon receipt of the respective notification indicating that the wireless communications received by the wireless access point 121 fall below a respective threshold level, the link management resource 150 provides notification of the condition to the connection management resource 140 (such as a native connection manager on the user equipment 111). The connection management resource 140 can be configured to use the notification as a basis in which to selectively initiate a respective handoff from the wireless access point 121 to the wireless base station 131.

Accordingly, the user equipment 111 (such as mobile communication device) transmits first wireless communications (such as uplink communications 128-1) over a first wireless communication link 127-1 to a first wireless access point 121 via a first wireless communication protocol. The user 111 receives a notification (such as via downlink communications 128-2) from the first wireless access point 121. The notification indicates power information associated with the first wireless access point 121 receiving the first wireless communications (such as a portion of the uplink communications 128-1) from the user equipment 111. The link management resource 150 and/or connection manager 140 receiving the notification controls handoff of the user equipment from the first wireless access point 121 to the second wireless access point (wireless base station 131) based on the received notification.

In accordance with one example, the notification received from the wireless access point 121 indicates a corresponding wireless power level at which the wireless access point 121 receives the uplink communications 128-1 transmitted from the antenna hardware AH1 over the wireless communication 127-1 to the wireless access point 121.

Note that the wireless communication protocol #1 can be any of multiple different suitable wireless communication protocols such as one that supports 802.11 communications (such as a Wi-Fi™ communication protocol, etc.) in a licensed or unlicensed bandwidth; the second wireless access point can be any suitable wireless communication protocols such as a cellular wireless communication protocol (such as LTE, 3G, 4G, 5G, New Radio, etc.). Each of the wireless communication protocols can be any suitable wireless communication protocol (Wi-Fi™, Wi-Fi™ direct, Zigbee, Z wave, Bluetooth, RF, 6LowPAN, GPRS/3G/LTE, near field communication, etc.) In one embodiment, the first wireless communication link 127-1 between the mobile communication device and the first wireless access point utilizes an unlicensed bandwidth (such as Wi-Fi™) to support conveyance of the first wireless communications (such as uplink and/or downlink communications 128).

Thus, in further examples, the user equipment 111 implements a communication management function such as link management resource 150. The link management resource 150 is in communication with power management resource 151 to receive the notification indicating wireless power level associated with the wireless access point 121 receiving the wireless communications 128-1. The power management resource 151 resides at the first wireless access point 121 or other suitable location. Alternatively, the power management resource 151 resides at a disparate location with respect to the first wireless access point 121. The user equipment 111 receives the notification of poor wireless reception by the wireless access point 121 via a message transmitted from the power management resource 151 through the first wireless access point 121 to the user equipment 111.

FIG. 2 is an example diagram illustrating tracking of link conditions as discussed herein.

As previously discussed, the power management resource 151 collects power level information (such as uplink wireless signal strength, uplink wireless communication link identifier, signal-to-noise ratio, etc.) associated with receiving wireless communications from the user equipment 111.

In this example, the power management resource 151 determines and stores a respective identity of the corresponding user equipment (111) transmitting the uplink communications 128-1 as well as the corresponding time at which the uplink communications are received at the wireless access point 121. Based on one or more determined wireless power levels of receiving respective uplink communications 128-1, the power management resource 151 generates corresponding information indicating the performance of the wireless access point 121 receiving uplink communications 128-1.

As previously discussed, in response to detecting that the power level associated with receiving the uplink communications 128-1 from the user equipment 111, the power management resource 151 or other suitable entity can be configured to generate a respective flag condition resulting in communication of a respective notification over wireless communication link 127-1 to the link management resource 150 indicating the poor uplink reception by the wireless access point 121. In such an instance, as previously discussed, the connection management resource 140 can be configured to initiate a respective handoff of the user equipment 111 from the wireless access point 121 to the wireless base station 131 as shown in FIG. 3.

Accordingly, the power information in the respective notification received by the link management resource 150 indicates a wireless power level of the first wireless access point 121 receiving first wireless communications (such as communications 128-1). The connection management resource 140 initiates the handoff of the user equipment 111 (mobile communication device) from the first wireless access point 121 to the second wireless access point (wireless base station 131) in response to detecting that a magnitude of the power level as indicated by the power information is below a threshold level.

FIG. 3 is an example diagram illustrating handoff of a respective communication device from a first wireless station to a second wireless station depending on link conditions as discussed herein.

As shown, subsequent to the handoff of the user equipment 111 from the wireless access point 121 to the wireless access point 131 based on detected poor uplink quality from the user equipment 111 to the wireless access point 121, the corresponding second wireless communication link 127-2 supports second wireless communications (such as uplink wireless communications 129-1 and downlink communications 129-2) associated with the user equipment 111 via the second wireless communication protocol (such as cellular, LTE, 3G, 4G, 5G, New Radio, etc.).

In one example, the second wireless communication link 127-2 between the user equipment 111 and the second wireless access point 131 utilizes a licensed bandwidth to support conveyance of the second wireless communications (such as uplink communications 129-1 and downlink communications 129-2).

Accordingly, as previously discussed, the user equipment 111 (such as mobile communication device) transmits first wireless communications (such as uplink communications 128-1) over a first wireless communication link 127-1 to a first wireless access point 121 via a first wireless communication protocol. The power management resource 151 produces status information indicating a wireless power of receiving the uplink communications. The user equipment 111 receives a notification (such as via downlink communications 128-2) from power management resource 151 through the first wireless access point 121. The notification indicates power information associated with the first wireless access point 121 receiving the first wireless communications (such as a portion of the uplink communications 128-1) from the user equipment 111. The link management resource 150 (in the user equipment 111) or other suitable entity receiving the notification controls handoff of the user equipment 111 from the first wireless access point 121 to the second wireless access point 131 based on the received notification indicating that the wireless power level of the wireless access point 121 receiving wireless communications from the user equipment 111 is below a respective threshold value.

Note further that the handoff decision by the link management resource 150 may be based on both the notification (such as indicating wireless power level of the wireless access point 121 receiving wireless communications from the user equipment 111) as well as a measured power level of wireless communications 128-2 received by the user equipment 111 from the wireless access point 121.

Figure 4:
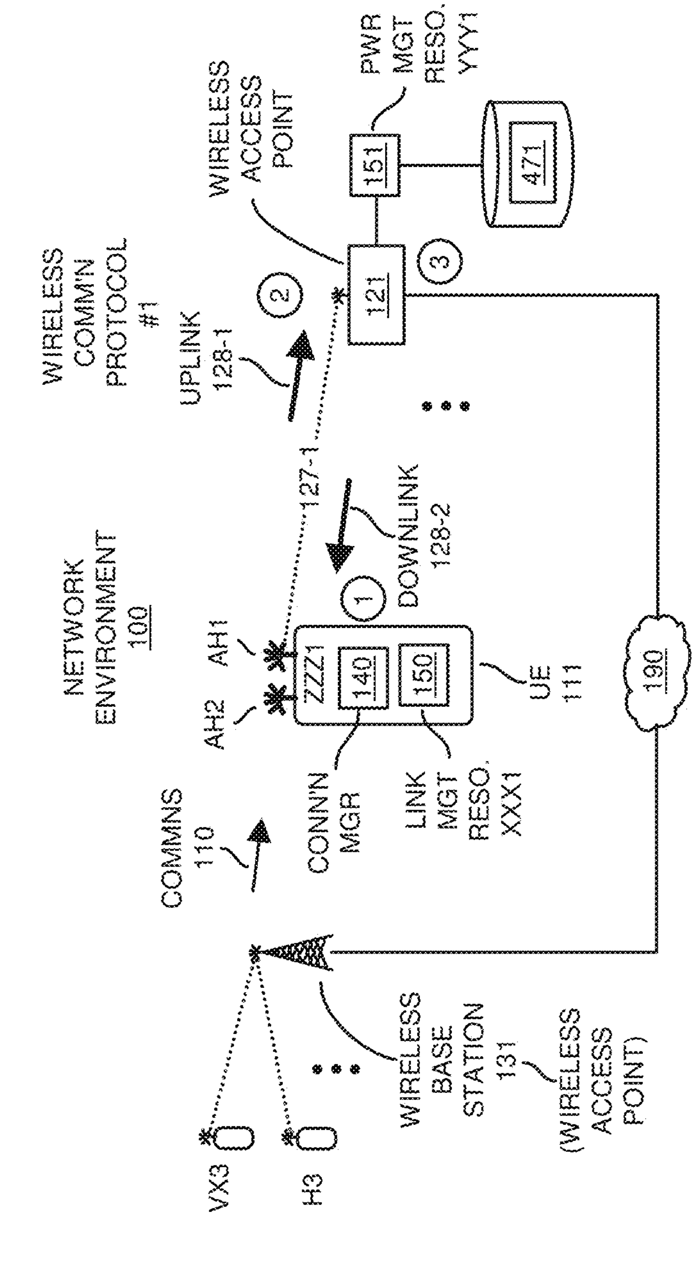
FIG. 4 is an example diagram illustrating a network environment and implementation of communication link monitoring and handoff management as discussed herein.
Figure 6:
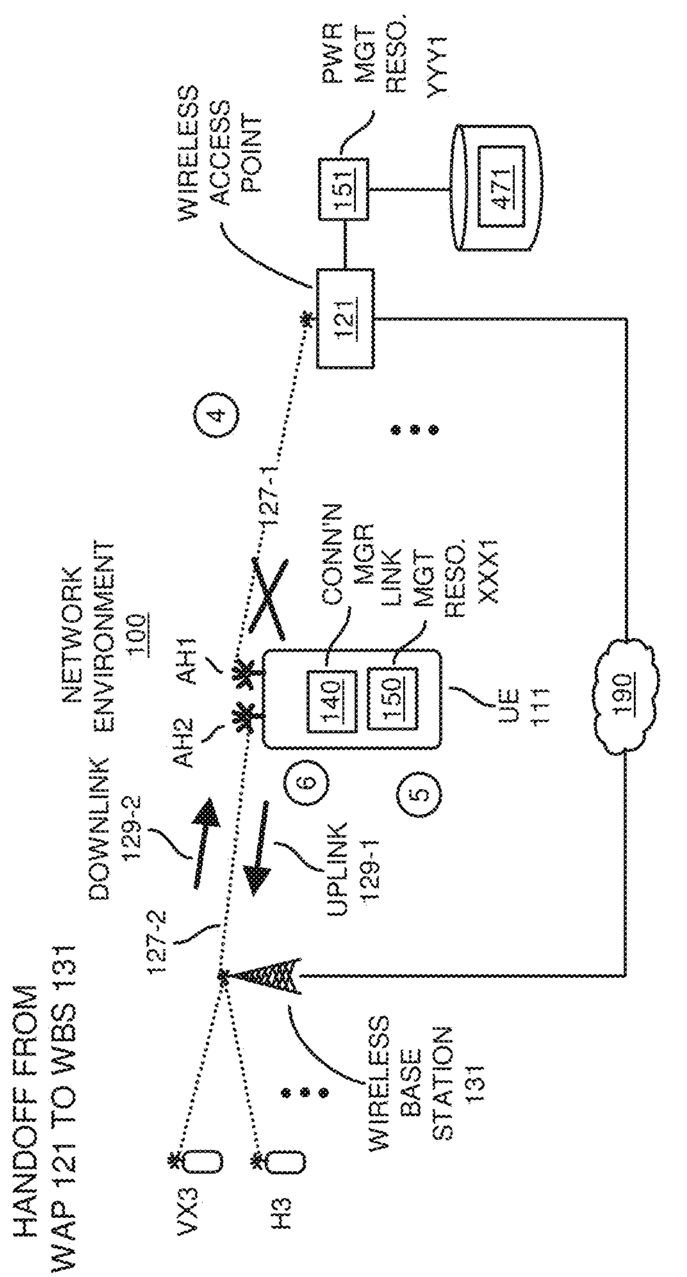
FIG. 6 is an example diagram illustrating handoff of a respective communication device from a first wireless station to a second wireless station depending on link conditions as discussed herein.

Direct Wireless Power Measurement Estimated Based on OFFSET FIGS. 4-6

FIG. 4 is an example diagram illustrating a network environment and implementation of communication link monitoring and handoff management as discussed herein.

In this so-called offset technique, the wireless access point 121 and corresponding WIFI access point doesn't send the UL power information to the link management resource 150 in a manner as previously discussed. Instead, the power management resource 151 generates and sends an offset value to the link management resource 150 (such as client). The link management resource 150 processes the offset value with a power measurement of downlink communications 128-2 measured by the user equipment 111. The link management resource 150 or other suitable entity estimates/determines the uplink wireless power level of the wireless access point 121 receiving the uplink wireless communications 128-1 and communicates the uplink wireless power level to the connection management resource 140 (such as operating system connection manager function). As previously discussed, based on the determined power level, the connection management resource 140 determines whether to initiate a respective handoff of the user equipment 111 from the wireless access point 121 to the wireless base station 131. Thus, it is up to the connection manager 140 to use this estimated the UL power and make a better decision to switch the user equipment 111 (such as a smartphone) from the wireless communication protocol #1 (such as Wi-Fi™) to wireless communication protocol #2 (such as cellular).

In one example, the offset threshold is calculated using historical detected downlink power over time, creating a statistical uplink power offset value.

Further in this example, as shown in FIG. 4, in a similar manner as previously discussed, the network environment 100 includes wireless base station 131 (a.k.a., a wireless access point), wireless access point 121, user equipment 111, link management resource 150 associated with the user equipment 111, power management resource 151 associated with the first wireless access point 121, and connection management resource 140 (a.k.a., a communication management resource associated with user equipment 111).

The user equipment 111 includes link management resource 150 (such as a client application) assigned a corresponding network address XXX1. As its name suggests, the connection management resource 140 (a.k.a., connection manager) controls wireless connectivity of the user equipment 111 to a respective wireless access point amongst multiple wireless access points present in the network environment 100.

As further shown in this example, the user equipment 111 includes first antenna hardware AH1 that supports wireless connectivity with wireless access points in network environment 100 supporting a first wireless communication protocol (such as wireless application protocol #1); the user equipment 111 includes a second antenna hardware AH2 that supports wireless connectivity with wireless access points in network environment 100 supporting a second wireless communication protocol (wireless communication protocol #2). In certain instances, the same antenna hardware associated with the user equipment 111 may be used to support wireless communications via the first wireless communication protocol and the second wireless application protocol.

Note again that the wireless downlink power of the wireless access point 121 receiving transmitted downlink communications 128-1 from the wireless access point 121 to the user equipment 111 may be 2-4 times (or even more such as 10 times) greater than the wireless power level of the wireless access point 121 receiving the uplink communications 128-1 transmitted from the user equipment 111 to the wireless access point 121. In such an instance, measurement of wireless communications received at the user equipment 111 from the first wireless access point 121 itself does not provide a good indication of how well the corresponding first wireless access point 121 receives wireless communications from the user equipment 111.

As previously discussed, the user equipment 111 can be configured to include a communication management resource 150 (a.k.a., connection management resource). The connection management resource 150 can be configured to control whether the user equipment 111 (such as a smart phone) is to remain connected to the first wireless access point 121 or switch over to a second wireless access point 131 because the link quality associated with the first wireless communication link is deemed to be poor. The client-server relationship between the link management resource 150 (client) of the user equipment 111 and the power management resource 151 (server) supports conveyance of network addressed communications regarding wireless power reception levels or related information facilitating as-needed and beneficial handoff of the user equipment 111 from the wireless base station 131 or vice versa.

FIG. 5 is an example diagram illustrating tracking of link conditions as discussed herein.

As previously discussed, the power management resource 151 collects power level information (such as timestamp information associated with a respective measurement, uplink wireless signal strength of the wireless access point 121 receiving the communications 128-1, wireless signal strength of the downlink communications from the wireless access point 121, etc.). The power management resource 151 generates the offset values 525 to be a difference between the downlink wireless signal strength and the uplink wireless signal strength.

Referring again to FIG. 4, as previously discussed, the user equipment 111 includes a link management resource 150 such as a client operative to: i) receive the UL offset value from the power management resource 151, ii) decode and acknowledge with status and time stamp reception of the offset value, iii) receive downlink wireless power level measurements information associated with the user equipment 111 receiving the downlink communications 128-2, iv) estimate the wireless power level of the wireless access point 121 receiving the uplink communications 128-1 using the DL measurement and the UL offset value 525 received from the power management resource 151, v) forward the estimated UL power estimate (estimate of a wireless power level of the wireless access point 121 receiving the wireless communication 128-1) to the connection manager 140. The link management resource 151 can be configured to provide a recommendation to the connection manager 140 or the connection manager itself determines whether to switch from wireless communication protocol #1 to wireless communication protocol #2 with timestamp information based on the magnitude of the estimated wireless power level that the wireless access point 121 receives the uplink communications 128-1.

The wireless access point 121 and corresponding power management resource 151 thus collect RF measurements (such as wireless power level of receiving the uplink communications 128-1) and calculate the offset value between uplink power level receipt and the downlink power level of communicating the communications 128-2 from the wireless access point 121 to the user equipment 111. The power management resource 151 (such as a server) is therefore operative to: i) collect the wireless power measurements (for UL, DL), ii) calculate the offset value 525 between the uplink reception power level and the downlink reception power level, ii) store and create historical data with probability distribution for the offset value, iii) based on historical data, build uplink offset performance threshold, iv) update the threshold based on operator input data/command and historical data, v) send a status to the cloud for operator O&M, vi) trigger a condition for UL power reception below a threshold, vii) time stamp, encode and send the UL offset value to the link management resource 151.

In response to the offset value (or estimate of power level of the wireless access point 121 receiving the uplink communications 128-1) dropping beyond a predefined threshold within a predefined hysteresis, the wireless access point 121 sends a message including the offset value 525 (such as 16) over communication link 127-1 to the link management resource 150. The link management resource 150 extracts the UL offset value 525 and estimates the power level of the wireless access point 121 receiving the uplink signal using offset value and wireless power level of DL communications 128-2 measurements.

Yet further, the link management resource 150 sends the estimated UL wireless power of the wireless access point 121 receiving the wireless communications 128-1 to the connection manager 140 associated with the user equipment 111. The connection manager 111 then uses the estimate of the uplink power level of the wireless access point 121 receiving the wireless communications 120-1 to make a respective handoff decision. For example, as previously discussed, if the estimated uplink power level of the wireless access point 121 receiving communications 128-1 is below a respective threshold level, the connection manager 140 initiates a handoff of the user criminal 111 from the wireless access point 121 to the wireless base station 131.

Accordingly, the communications received by the link management resource 150 from the power management resource 151 include an offset value indicating a difference between: i) a first wireless power of the first wireless access point 121 receiving uplink wireless signals transmitted from the user equipment 111, and ii) a second wireless power of the user equipment 111 receiving downlink wireless signals transmitted from the first wireless access point 121 to the user equipment 111. The link management resource 150 or other suitable entity estimates an uplink power level of the first wireless access point 121 receiving the first wireless communications (such as uplink communications 128-1) via the received offset value and a wireless power level of the user equipment 111 receiving wireless signals (downlink communications 128-2) from the first wireless access point 121.

In one example, the user equipment 111 and corresponding link management resource 150 receives the power information including the offset value from the in response to a condition in which the offset value is below a threshold level.

Further in this example, at or around time T10, in operation #1, the user equipment 111 detects that the antenna hardware AH1 receives wireless signals from the downlink 128-2 at a wireless power level of −65 dBm. The user equipment 111 communicates this information (−65 dBm) to the wireless access point 121. The power management resource 151 stores this information in status information 471 as shown in FIG. 5.

In operation #2, the wireless access point 121 receives wireless signals (such as from the uplink 128-1) from the user equipment 121 at a wireless power level of −75 dBm. The power management resource 151 stores this information in status information 171. (see FIG. 5)

In operation #3, the power management resource 151 then calculates the offset value as −10 dB (difference between −65 dBm and −75 dBm) and stores the offset value in status information 171.

FIG. 6 is an example diagram illustrating handoff of a respective communication device from a first wireless station to a second wireless station depending on link conditions as discussed herein.

As shown, subsequent to the handoff of the user equipment 111 from the wireless access point 121 to the wireless access point 131, the corresponding second wireless communication link 127-2 supports second wireless communications (such as uplink wireless communications 129-1 and downlink communications 129-2) associated with the user equipment 111 via the second wireless communication protocol (such as cellular, LTE, 3G, 4G, 5G, New Radio, etc.).

Accordingly, as previously discussed, the user equipment 111 (such as mobile communication device) transmits first wireless communications (such as uplink communications 128-1) over a first wireless communication link 127-1 to a first wireless access point 121 via a first wireless communication protocol. The power management resource 151 produces a respective offset value 525 associated with a power level of the wireless access point 121 receiving the uplink communications 128-1. The user equipment 111 receives a notification (such as via downlink communications 128-2) from power management resource 151 through the first wireless access point 121. The notification indicates the offset value associated with the first wireless access point 121 receiving the first wireless communications (such as a portion of the uplink communications 128-1) from the user equipment 111. The link management resource 150 (in the user equipment 111) receiving the notification controls handoff of the user equipment 111 from the first wireless access point 121 to the second wireless access point 131 based on the received notification and corresponding offset value, which is used to determine the wireless power level of the wireless access point 121 receiving wireless communications 128-1 from the user equipment 111 and that such a determined wireless power level is below a respective threshold value.

Further in this example, in operation #4, the wireless access point 121 communicates the offset value of 10 (or −10 dB) to the link management resource 150 associated with the user equipment 111.

In operation #5, the link management resource 150 (client) calculates the uplink power level of the wireless access point 121 receiving the uplink wireless communications (a.k.a., uplink power level value) at or around time T10 as the downlink power level (−65 dBm) plus the offset value (−10 dB). Accordingly, the link management resource 150 detects that the wireless access point 121 receives wireless communications at or around time T10 from the user equipment 111 at the wireless power level of −75 dBm.

In operation #6, the link management resource 150 communicates the calculated uplink power level value (−75 dBm) to the connection manager 140. In a manner as previously discussed, if the link management resource 150 detects that the wireless power level of the wireless access point 121 receiving the uplink communications (calculated uplink power level value of −75 dBm) is below a threshold level (such as −70 dBm or other suitable value), then the link management resource 150 initiates a handoff of the user equipment 111 from the wireless access point 121 to the wireless base station 131.

Figure 7:
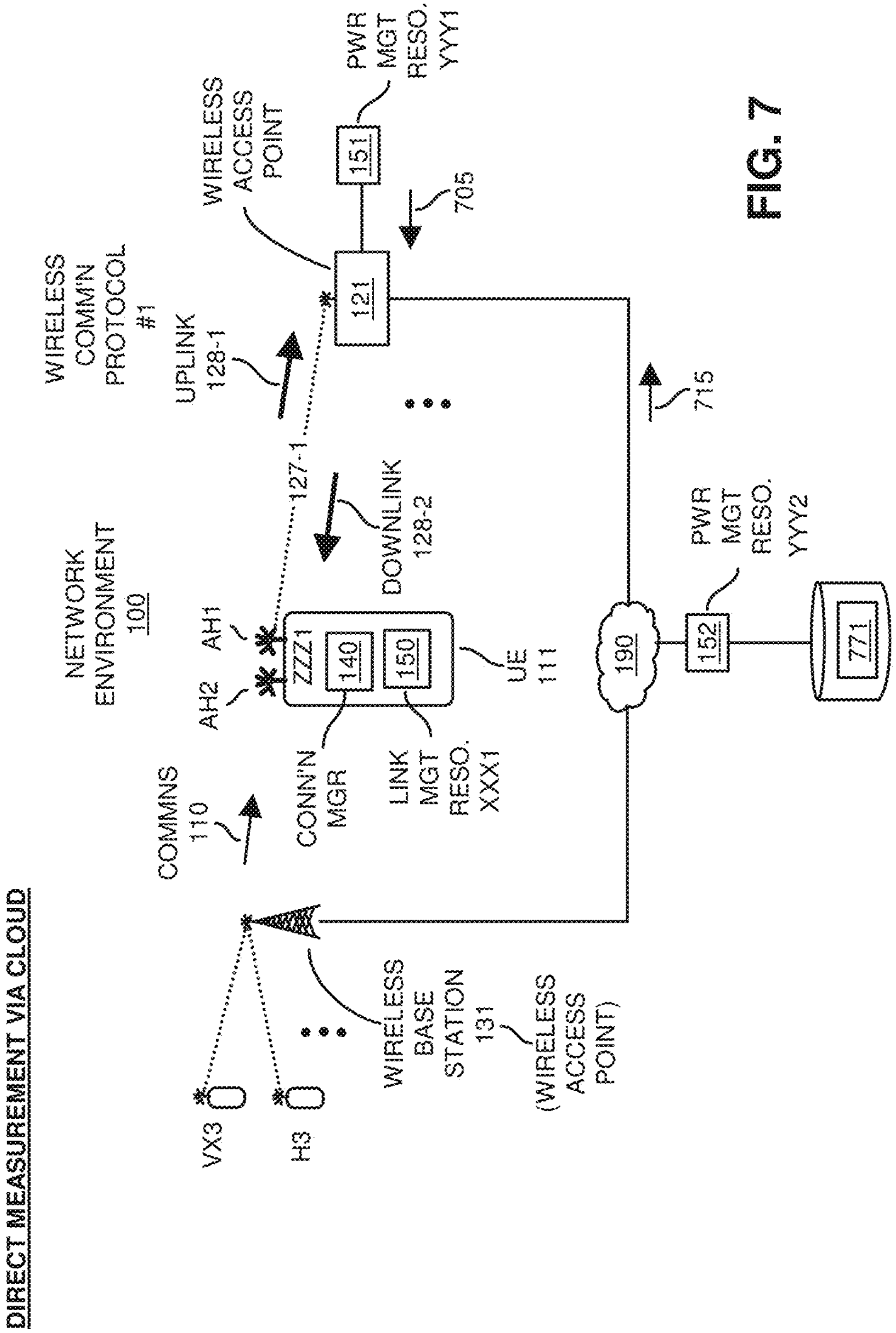
FIG. 7 is an example diagram illustrating a network environment and implementation of communication link monitoring and handoff management as discussed herein.
Figure 9:
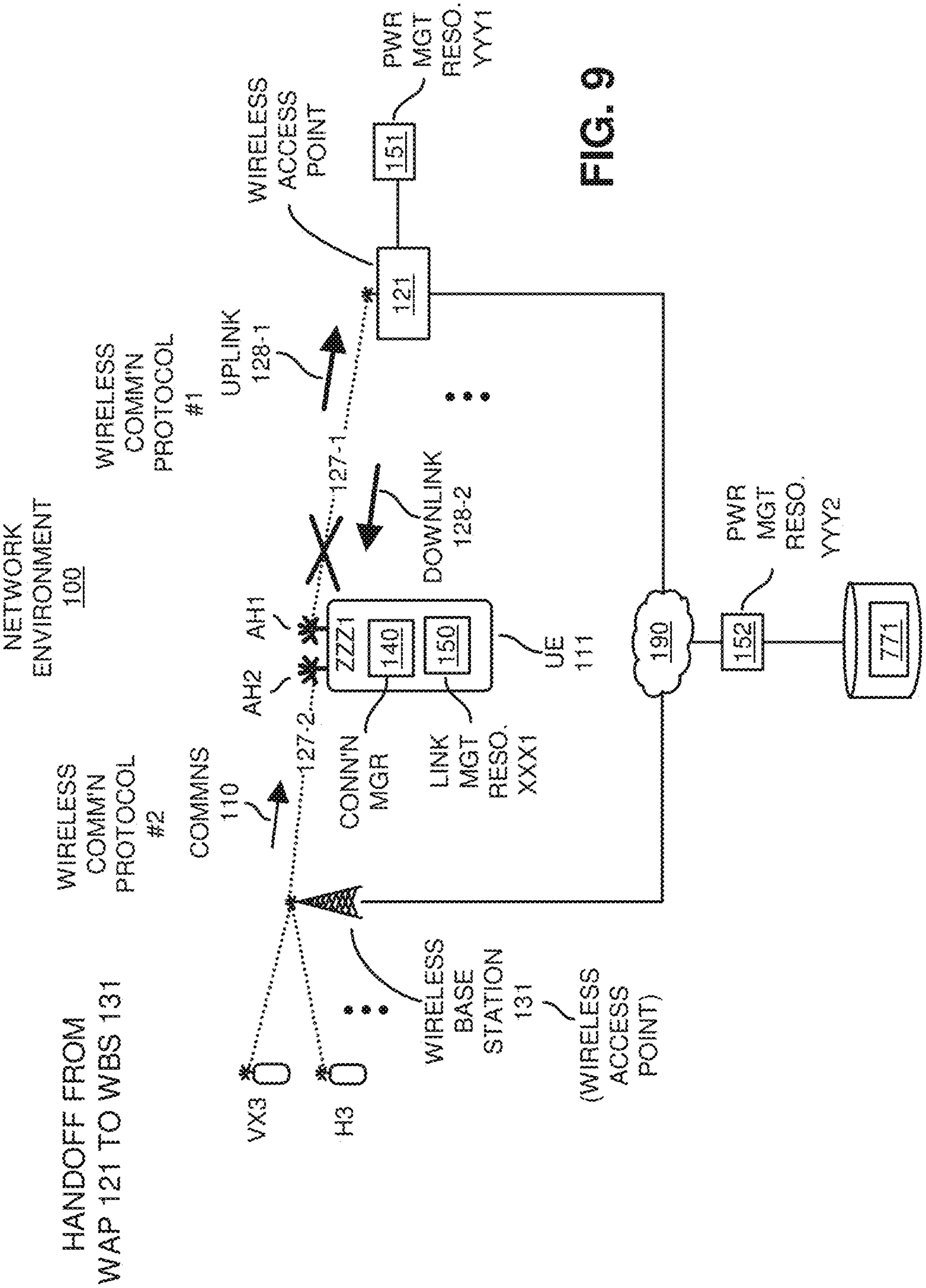
FIG. 9 is an example diagram illustrating handoff of a respective communication device from a first wireless station to a second wireless station depending on link conditions as discussed herein.

Direct Wireless Power Measurement Via Cloud FIGS. 7-9

FIG. 7 is an example diagram illustrating a network environment and implementation of communication link monitoring and handoff management as discussed herein.

In this example, the power management resource 151 monitors a magnitude of the wireless power level of receiving the communications 128-1 in a similar manner as previously discussed. The power management resource 151 forwards the monitored power level information to the power management resource 152 (such as a cloud controller) residing in the cloud network (such as network 190). The power management resource 152 forwards power level information indicating a wireless power level of the wireless access point 121 receiving the wireless communications 128-1 to the link management resource 150. The power level information is used to determine whether to initiate a respective handoff from the first wireless access point 121 to the wireless base station 131.

More specifically, the wireless access point 121 includes a respective power management resource 151 (such as a software client). The power management resource 151 collects measurement information indicating a corresponding wireless power level of receiving wireless communications 128-1 over the wireless communication link 127-1. The power management resource 151 encodes the power level measurements and forwards them to the link management resource 152 such as a cloud controller (assigned network address YYY2).

In this example, via communications 705 from the power management resource 151, the power management resource 152 determines and stores (in status information 771) a respective identity of the corresponding user equipment (111) transmitting the uplink communications 128-1 as well as the corresponding time at which the uplink communications are received at the wireless access point 121 and a measurement being taken. Based on the one or more determined wireless power levels of receiving respective uplink communications 128-1 at the wireless access point 121, the power management resource 152 or other suitable entity generates corresponding status information (such as status information 771) indicating the performance and power level of the wireless access point 121 receiving uplink communications 128-1.

Thus, in one example embodiment, the power management resource 152 (such as a Wi-Fi™ cloud controller or other suitable entity) acts as a server. The power management resource 152 receives data from the wireless access point 121 and corresponding power management resource 151, where the received data indicates a respective power level of the wireless access point 121 receiving the wireless communications 128-1 from the user 111. The power management resource 152 stores the received data and creates a historical data set (status information 771). If desired, based on historic data, the power management resource 152 produces a respective uplink performance threshold value. The power management resource 152 can be configured to update the threshold value based on operator input data/command and historic data and saves the status for operator O&M. In one example, the power management resource 152 compares the respective power level (as indicated by the status information 771) at which the wireless access point 121 receives the wireless communications 128-1 and compares to a respective threshold value.

As previously discussed, in response to (the user equipment 111, power management resource 151, or the power management resource 152, or other suitable entity) detecting that the power level associated with receiving the uplink communications 128-1 from the user equipment 111 is below the respective threshold value, the corresponding entity such as the power management resource 152 generates a respective flag condition resulting in communication of a respective notification (such as via communications 715) from the power management resource 152 through wireless access point 121 and over wireless communication link 127-1 to the link management resource 150 of the user equipment 111. The notification indicates the poor uplink reception by the wireless access point 121 such as a magnitude of the wireless power level associated with the wireless access point 121 receiving communications 128-1 being below the respective (performance) threshold level. In such an instance, as previously discussed, because the link quality associated with the wireless communication link 127-1 is poor, the connection management resource 140 (receiving such notification) can be configured to initiate a respective handoff of the user equipment 111 from the wireless access point 121 to the wireless base station 131 as shown in FIG. 9.

Thus, after the wireless power level of the wireless access point 121 receiving communications 128-1 drops below a predefined threshold within a predefined hysteresis, the power management resource 152 or other suitable entity sends a (handoff or power level) message to the user equipment 111 at network address XXX1 resulting in a handoff of the user equipment 111 from the wireless access point 121 to the wireless base station 131.

FIG. 8 is an example diagram illustrating tracking of link conditions as discussed herein.

As previously discussed, via communications 705 from the power management resource 151, the power management resource 152 collects power level information (such as uplink wireless signal strength, uplink communication link identifier, signal-to-noise ratio, etc.) associated with the wireless access point 121 receiving wireless communications from the user equipment 111.

In this example, the power management resource 151 determines and stores a respective identity of the corresponding user equipment (111) transmitting the uplink communications 128-1 as well as the corresponding time at which the uplink communications are received at the wireless access point 121. Based on one or more determined wireless power levels of receiving respective uplink communications 128-1, the power management resource generates corresponding information indicating the performance of the wireless access point 121 receiving uplink communications 128-1.

As previously discussed, in response to detecting that the power level associated with receiving the uplink communications 128-1 from the user, 111, the power management resource 151 or other suitable entity can be configured to generate a respective flag condition resulting in communication of a respective notification over wireless communication link 127-1 to the link management resource 150 indicating the poor uplink reception by the wireless access point 121. In such an instance, as previously discussed, the connection management resource 140 can be configured to initiate a respective handoff of the user equipment 111 from the wireless access point 121 to the wireless base station 131 as shown in FIG. 9.

Accordingly, in one example, the power information in the respective notification received by the link management resource 150 indicates a wireless power level of the first wireless access point 121 receiving first wireless communications (such as communications 128-1). The connection management resource 140 initiates the handoff of the user equipment 111 (mobile communication device) from the first wireless access point 121 to the second wireless access point (wireless base station 131) in response to detecting that a magnitude of the power level as indicated by the power information is below a threshold level.

FIG. 9 is an example diagram illustrating handoff of a respective communication device from a first wireless station to a second wireless station depending on link conditions as discussed herein.

As shown, subsequent to the handoff of the user equipment 111 from the wireless access point 121 to the wireless access point 131, the corresponding second wireless communication link 127-2 supports second wireless communications (such as uplink wireless communications 129-1 and downlink communications 129-2) associated with the user equipment 111 via the second wireless communication protocol (such as cellular, LTE, 3G, 4G, 5G, New Radio, etc.).

Figure 10:
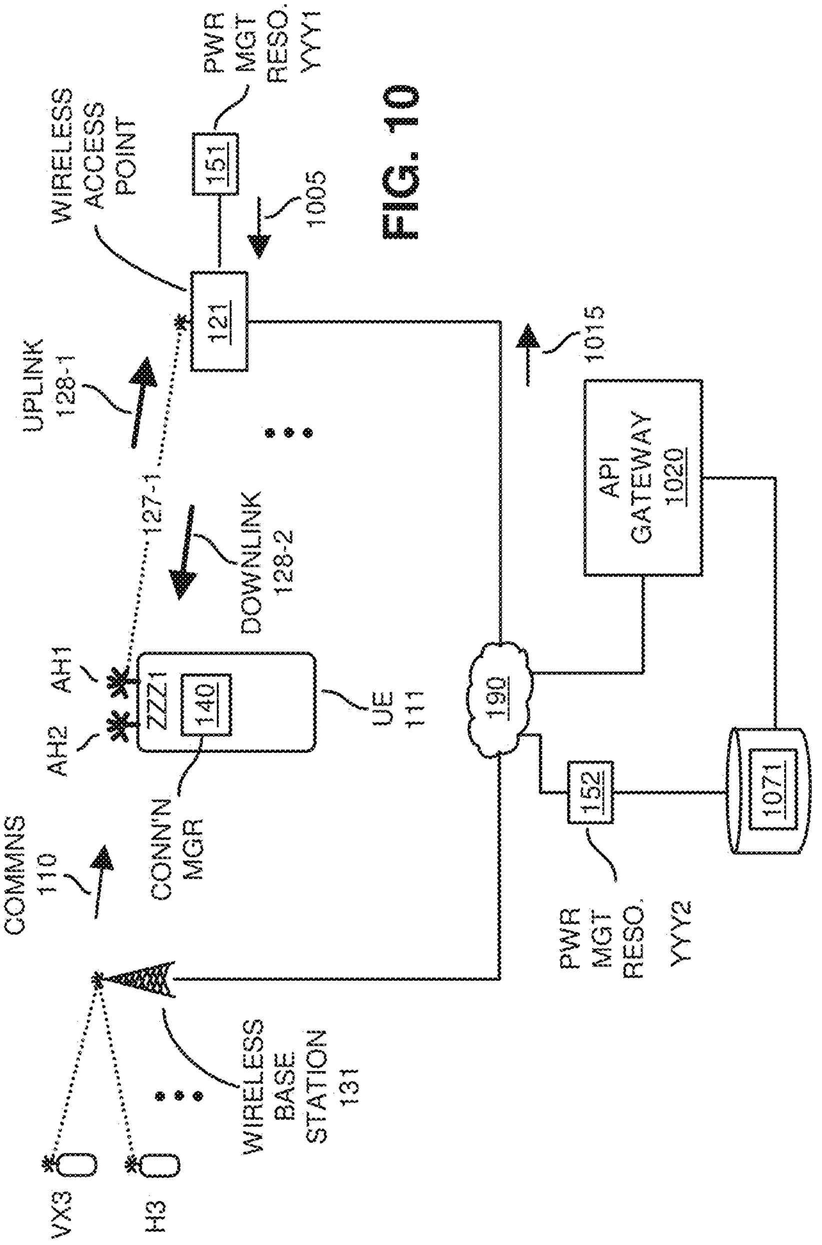
FIG. 10 is an example diagram illustrating a network environment and implementation of communication link monitoring and handoff management as discussed herein.
Figure 12:
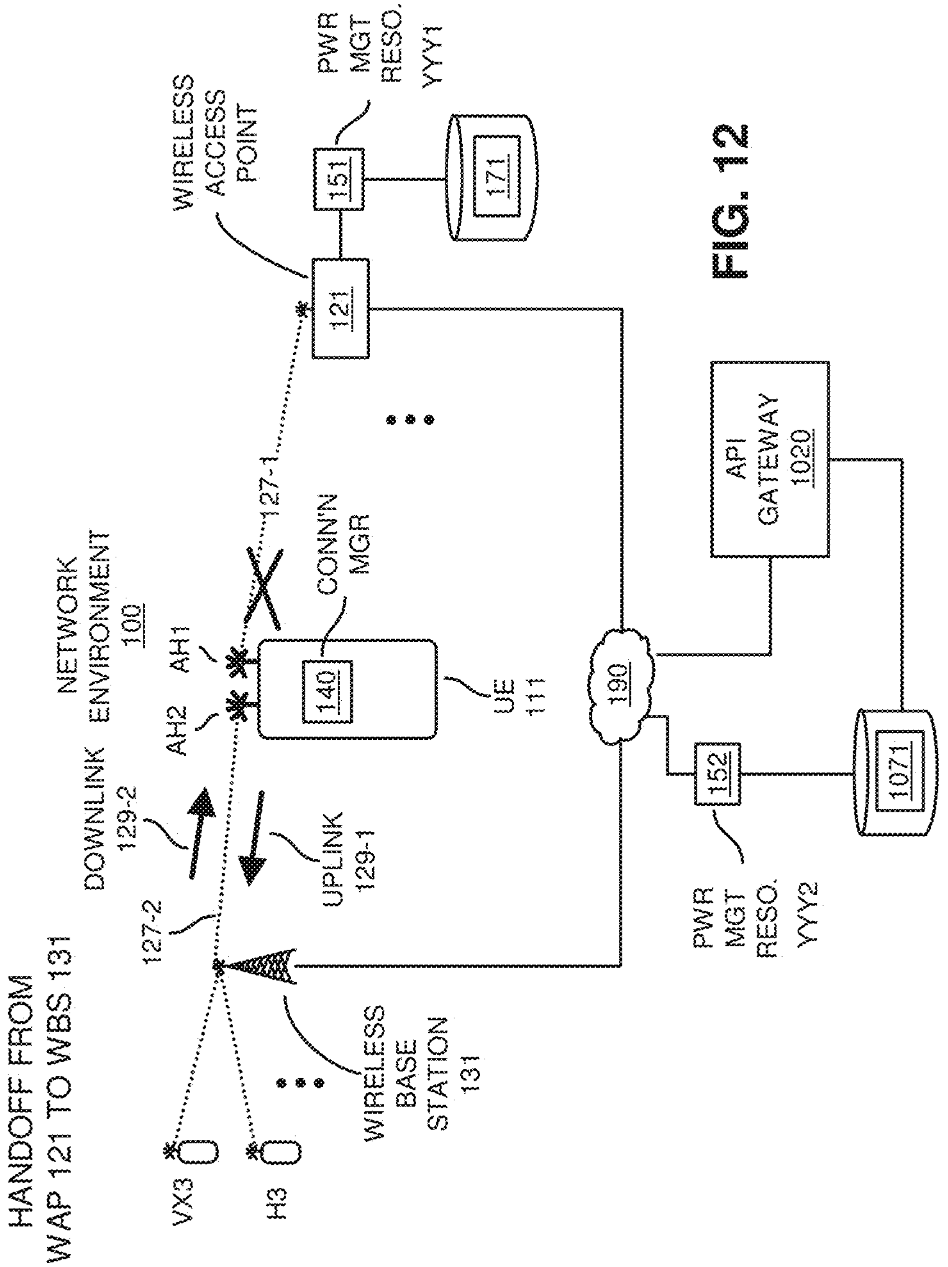
FIG. 12 is an example diagram illustrating handoff of a respective communication device from a first wireless station to a second wireless station depending on link conditions as discussed herein.

Direct Wireless Power Measurement Via Cloud API FIGS. 10-12

FIG. 10 is an example diagram illustrating a network environment and implementation of communication link monitoring and handoff management as discussed herein.

In this example, the power management resource 151 monitors a magnitude of the wireless power level of receiving the wireless uplink communications 128-1 in a similar manner as previously discussed. The power management resource 151 forwards the monitored power level information via communications 1005 to the power management resource 152 (such as a cloud controller) residing in the cloud network (such as network 190).

More specifically, the wireless access point 121 includes a respective power management resource 151 (such as a software client). The power management resource 151 collects wireless power level measurement information indicating a corresponding wireless power level of receiving wireless communications 128-1 over the wireless communication link 127-1. The power management resource 151 encodes the power level measurements and forwards them to the power management resource 152 such as a cloud controller (assigned network address YYY2).

In this example, via communications 1005 from the power management resource 151, the power management resource 152 determines and stores (in status information 1071) a respective identity of the corresponding user equipment (111) transmitting the uplink communications 128-1 as well as the corresponding time at which the uplink communications are received at the wireless access point 121 and a measurement being taken. Based on the one or more determined wireless power levels of receiving respective uplink communications 128-1 at the wireless access point 121 (as indicated by communications 1005), the power management resource 152 or other suitable entity generates corresponding status information (such as status information 1071) indicating the performance of the wireless access point 121 receiving uplink communications 128-1.

Thus, in one example embodiment, the power management resource 152 (such as a Wi-Fi™ cloud controller or other suitable entity) acts as a server. The power management resource 152 receives data from the wireless access point 121 and corresponding power management resource 151, where the received data indicates a respective power level of the wireless access point 121 receiving the wireless medications 128-1 from the user 111. The power management resource 152 stores the received data and create a historical data set (status information 771).

The API (Application Programming Interface) gateway 1020 acts as a server to distribute the status information 1071 to the connection manager 140 or the user equipment 111. For example, the application programming interface gateway 1020 can be configured to include a respective REST API provide the user equipment 111 and corresponding connection manager 140 access to the corresponding status information 1071.

In one example, the connection manager 140 communicates (such as via a call to the API associated with the API gateway 1020) over the wireless communication link 127-1 through the wireless access point 121 to the API gateway 1020 to retrieve the corresponding status information 1071 associated with the wireless access point 121 receiving the uplink communications 128-1. The connection management resource 140 compares the respective power level (as indicated by the status information 1071) at which the wireless access point 121 receives the wireless communications 128-1 and compares it to a respective threshold value.

As previously discussed, in response to (the user equipment 111, power management resource 151, or the power management resource 152, or other suitable entity) detecting that the power level associated with receiving the uplink communications 128-1 at wireless access point 121 from the user equipment 111 is below the respective threshold value based on received communications 1015 including status information 1071, the connection management resource 140 initiates handoff of the user equipment 111 from the wireless access point 121 to the wireless base station 131 (see FIG. 12). The notification (such as status information 1071 in the communications 1015) indicates the poor uplink reception by the wireless access point 121 such as a magnitude of the wireless power level associated with the wireless access point 121 receiving communications 128-1 being below the respective (performance) threshold level. In such an instance, as previously discussed, because the link quality associated with the wireless communication link 127-1 is poor, the connection management resource 140 (receiving such notification) can be configured to initiate a respective handoff of the user equipment 111 from the wireless access point 121 to the wireless base station 131.

Thus, after the wireless power level of the wireless access point 121 receiving communications 128-1 drops below a predefined threshold within a predefined hysteresis as detected by the connection manager 140 communicating with the API gateway 1020, the connection manager 140 hands off of the user equipment 111 from the wireless access point 121 to the wireless base station 131.

Accordingly, embodiments herein include the connection manager 140 receiving the notification (such as the wireless access point 121 receiving the wireless power level of receiving communications 128-1 below threshold level) from the API (Application Programming Interface) gateway 1020 in response to the user equipment 111 (mobile communication device) calling, through the first wireless access point 121, an application programming interface at the API gateway 1020 (such as a server resource) to retrieve the status information 1071 indicating poor link quality associated with the wireless communication link 127-1.

FIG. 11 is an example diagram illustrating tracking of link conditions as discussed herein.

As previously discussed, via communications 1005 from the power management resource 151, the power management resource 152 collects power level information (such as uplink wireless signal strength, uplink communication link identifier, signal-to-noise ratio, etc.) associated with the wireless access point 121 receiving wireless communications from the user equipment 111.

In this example, based on communications 1005, the power management resource 152 determines and stores a respective identity of the corresponding user equipment (111) transmitting the uplink communications 128-1 as well as the corresponding time at which the uplink communications are received at the wireless access point 121. Based on one or more determined wireless power levels of receiving respective uplink communications 128-1, the power management resource 152 generates corresponding information 1071 indicating the performance of the wireless access point 121 receiving uplink communications 128-1. As previously discussed, in response to the connection manager 140 detecting that the power level associated with receiving the uplink communications 128-1 from the user equipment 111 is below a respective performance threshold level, the connection manager 140 initiates a respective handoff of the user equipment 111.

FIG. 12 is an example diagram illustrating handoff of a respective communication device from a first wireless station to a second wireless station depending on link conditions as discussed herein.

As shown, subsequent to the handoff of the user equipment 111 from the wireless access point 121 to the wireless access point 131, the corresponding second wireless communication link 127-2 supports second wireless communications (such as uplink wireless communications 129-1 and downlink communications 129-2) associated with the user equipment 111 over wireless communication link 127-2 via the second wireless communication protocol (such as cellular, LTE, 3G, 4G, 5G, New Radio, etc.).

Figure 13:
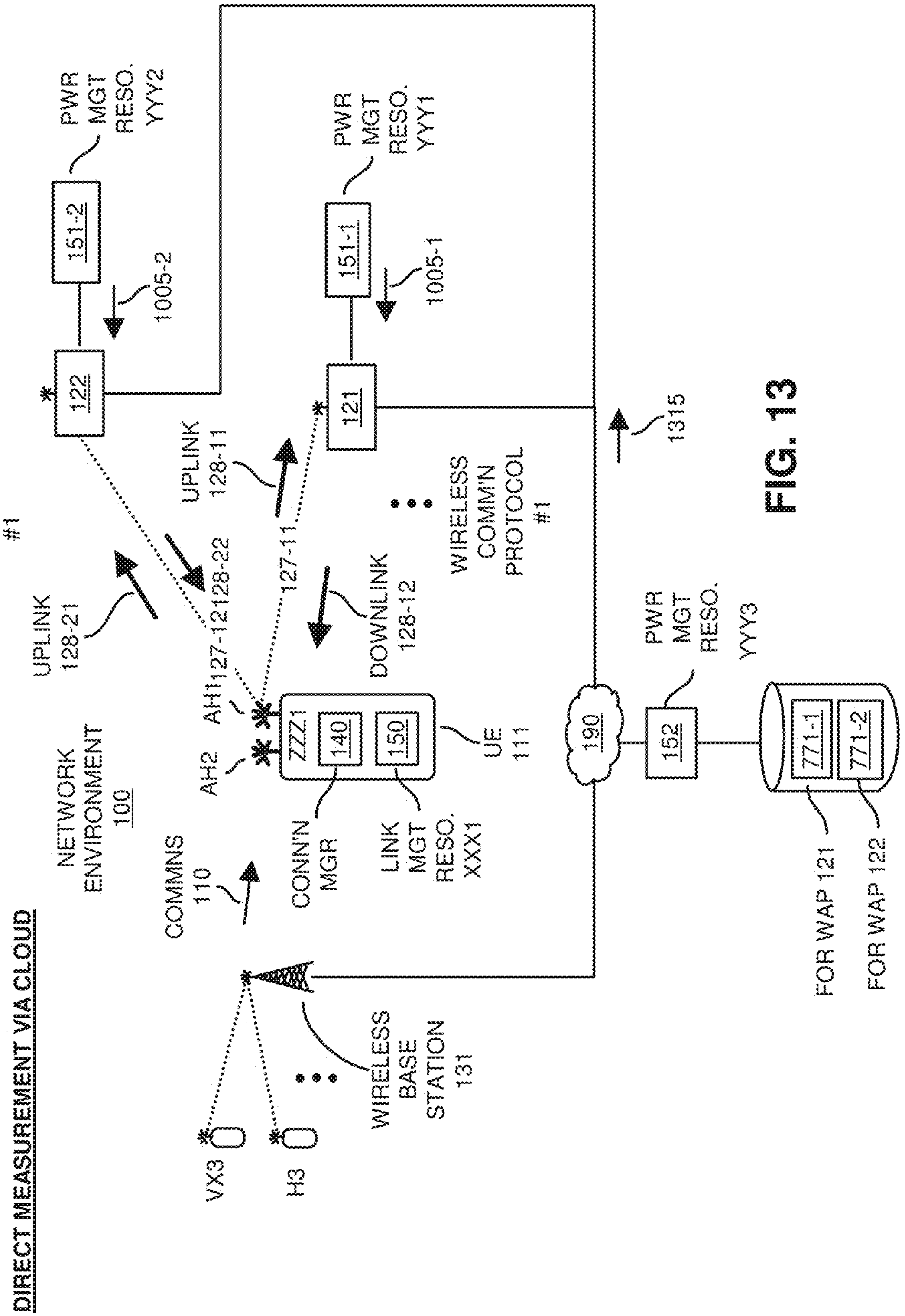
FIG. 13 is an example diagram illustrating a network environment and implementation of communication link monitoring and handoff management as discussed herein.
Figure 15:
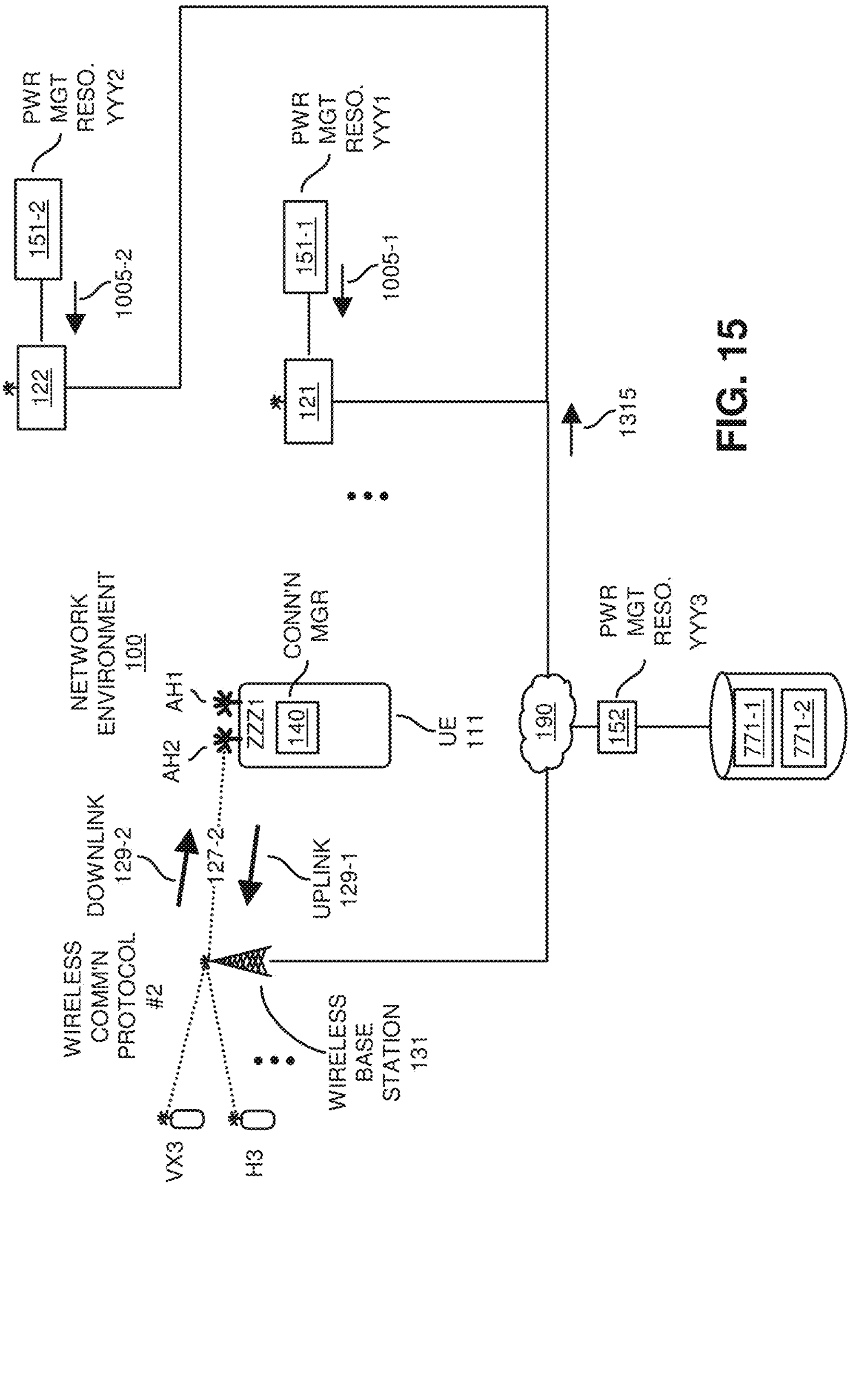
FIG. 15 is an example diagram illustrating handoff of a respective communication device from a first wireless station to a second wireless station or a third wireless station depending on link conditions as discussed herein.

Uplink Wireless Power Measurement FIGS. 13-15

FIG. 13 is an example diagram illustrating a network environment and implementation of communication link monitoring and handoff management as discussed herein.

In this example, the network environment 100 includes power management resource 151-1, power management resource 151-2, and power management resource 151-3 in addition to the other entities as previously discussed.

The power management resource 151-1 monitors a magnitude of the wireless power level of receiving the communications 128-11 (power level information) in a similar manner as previously discussed. The power management resource 151-1 forwards the monitored power level information to the power management resource 152 (such as a cloud controller) residing in the cloud network (such as network 190).

In a similar manner, the power management resource 151-2 monitors a magnitude of the wireless power level of receiving the communications 128-12 21. The power management resource 151-2 forwards the monitored power level information to the power management resource 152 (such as a cloud controller) residing in the cloud network (such as network 190).

Thus, the wireless access point 121 includes a respective power management resource 151-1 (such as a software client) that collects measurement information indicating a corresponding wireless power level of receiving wireless communications 128-11 over the wireless communication link 127-11. The power management resource 151-1 encodes the power level measurements and forwards them (such as via communications 1005-1) to the link management resource 152 such as a cloud controller (assigned network address YYY3). Via the communications 1005-1 from the power management resource 151-1, the power management resource 152 determines and stores (in status information 771-1) a respective identity of the corresponding user equipment (111) transmitting the uplink communications 128-11 as well as the corresponding time at which the uplink communications are received at the wireless access point 121 and a measurement being taken. Based on the one or more determined wireless power levels of the wireless access point 121 receiving respective uplink communications 128-11, the power management resource 152 or other suitable entity generates corresponding status information (such as status information 771-1) indicating the performance of the wireless access point 121 receiving uplink communications 128-11.

The wireless access point 122 includes a respective power management resource 151-2 (such as a software client) that collects measurement information indicating a corresponding wireless power level of receiving wireless communications 128-21 over the wireless communication link 127-12. The power management resource 151-2 encodes the power level measurements and forwards them (such as via communications 1005-2) to the link management resource 152 such as a cloud controller (assigned network address YYY3). Via the communications 1005-2 from the power management resource 151-2, the power management resource 152 determines and stores (in status information 771-2) a respective identity of the corresponding user equipment (111) transmitting the uplink communications 128-21 as well as the corresponding time at which the uplink communications are received at the wireless access point 122 and a measurement being taken. Based on the one or more determined wireless power levels of the wireless access point 122 receiving respective uplink communications 128-21, the power management resource 152 or other suitable entity generates corresponding status information (such as status information 771-2) indicating the performance of the wireless access point 122 receiving uplink communications 128-21.

In one example, the power management resource 152 (such as a Wi-Fi™ cloud controller or other suitable entity) acts as a server. The power management resource 152 receives data from the wireless access point 121 and corresponding power management resource 151-1 as well as data from the wireless access point 123 and corresponding power management resource 151-2, where the received data indicates a respective power level of the wireless access points receiving the respective wireless communications from the user 111. The power management resource 152 stores the received data and creates a historical data set (status information 771). If desired, based on historic data, the power management resource 152 produces a respective uplink performance threshold value. The power management resource 152 can be configured to update the threshold value based on operator input data/command and historic data and saves the status for operator O&M. In one example, the power management resource 152 compares the respective power level (as indicated by the status information 771) at which the respective wireless access points receive the wireless communications and compares it to a respective threshold value for each wireless access point.

If the magnitude of the wireless power level of the wireless access point 121 of receiving communications 128-11 falls below a threshold level and the magnitude of the wireless power level of the wireless access point 122 receiving the wireless communications is above the threshold level, the connection manager 140 can be configured to select connectivity with the wireless access point 122 and drop the wireless communication link 127-11 between the user equipment 111 and the wireless access point 121.

If the magnitude of the wireless power level of the wireless access point 121 of receiving communications

128-11 falls below a threshold level and the magnitude of the wireless power level of the wireless access point 122 receiving the wireless communications 128-21 is also below the threshold level, the connection manager 140 can be configured to select connectivity of the user equipment 111 with the wireless base station 131 and drop both the wireless communication link 127-11 and 127-12.

FIG. 14 is an example diagram illustrating tracking of link conditions as discussed herein.

As previously discussed, via communications from the power management resource 151-1 and power management resource 151-2, the power management resource 152 collects power level information (such as uplink wireless signal strength, uplink communication link identifier, signal-to-noise ratio, etc.) associated with the wireless access point 121 receiving wireless communications from the user equipment 111 and wireless access point 122 receiving wireless communications from the user equipment 111.

In this example, the respective power management resource determines and stores a respective identity of the corresponding user equipment (111) transmitting the uplink communications as well as the corresponding time at which the uplink communications are received at the corresponding wireless access point in a manner as previously discussed. Based on one or more determined wireless power levels of receiving respective uplink communications, the power management resource 152 generates corresponding information indicating the performance of each of the wireless access points receiving uplink communications. As previously discussed, in response to detecting that the power level associated with receiving the uplink communications from the user equipment 111, the power management resource 151 or other suitable entity can be configured to generate a respective flag condition resulting in communication of a respective notification over a respective wireless communication link to the link management resource 150 or connection manager 140 indicating the poor uplink reception by the wireless access point 121 and/or poor uplink reception by the wireless access point 122. In such an instance, as previously discussed, the connection management resource 140 can be configured to initiate a respective handoff of the user equipment 111 from the wireless access point 121 and/or the second wireless access point 122 to the wireless base station 131 as shown in FIG. 14.

FIG. 15 is an example diagram illustrating handoff of a respective communication device from a first wireless station to a second wireless station depending on link conditions as discussed herein.

As shown, subsequent to the handoff of the user equipment 111 from the wireless access point 121 and/or the wireless access point 122 to the wireless base station 131, the corresponding second wireless communication link 127-2 supports second wireless communications (such as uplink wireless communications 129-1 and downlink communications 129-2) associated with the user equipment 111 over wireless communication link 127-2 to wireless base station 131 via the second wireless communication protocol (such as cellular, LTE, 3G, 4G, 5G, New Radio, etc.).

Figure 16:
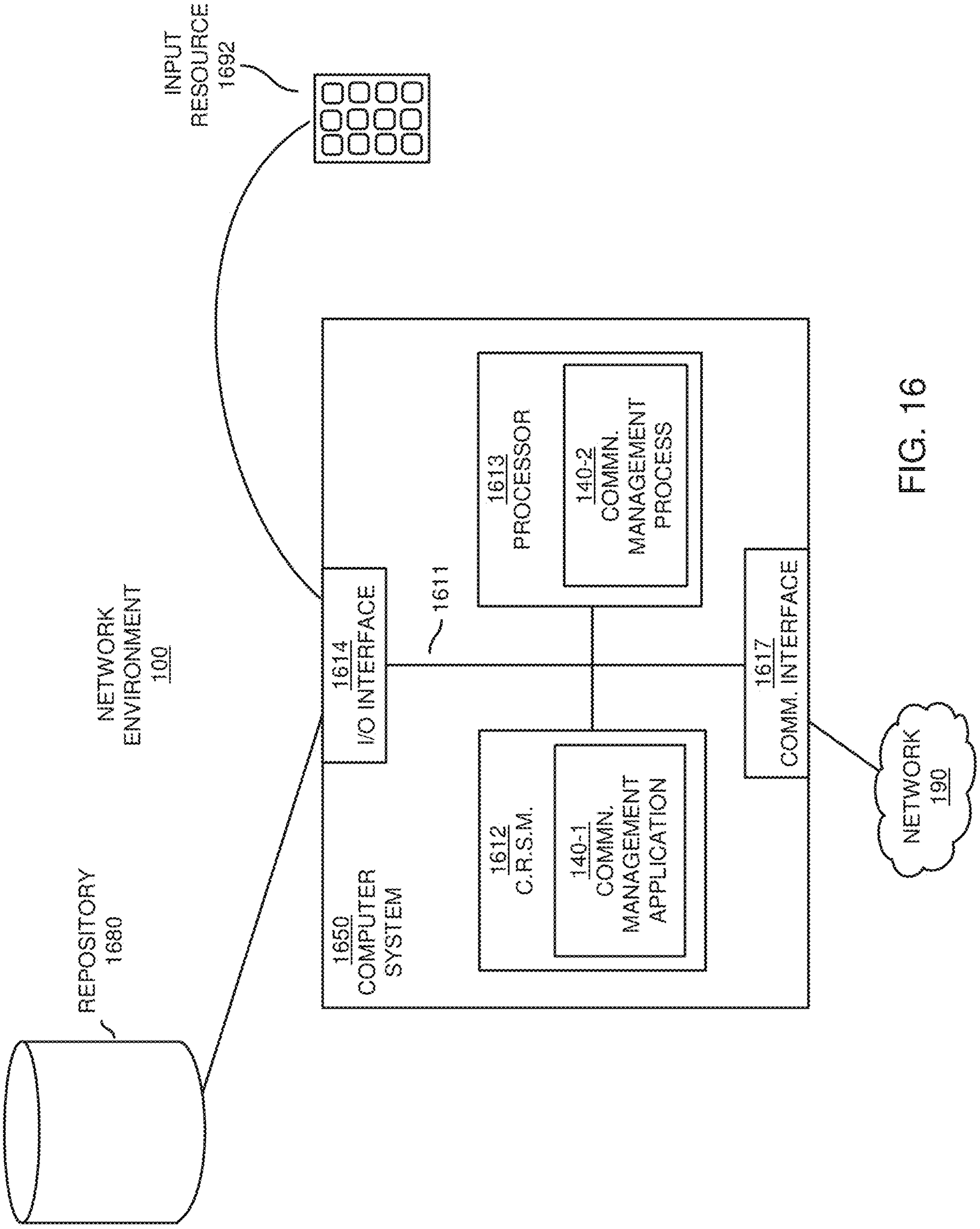
FIG. 16 is an example diagram illustrating example computer hardware and software operable to execute operations as discussed herein.

FIG. 16 is an example block diagram of a computer system for implementing any of the operations as previously discussed according to embodiments herein.

Note that any of the resources as discussed herein can be configured to include computer processor hardware and/or corresponding executable instructions to carry out the different operations as discussed herein.

For example, as shown, computer system 1650 of the present example includes interconnect 1611 coupling computer readable storage media 1612 such as a non-transitory type of media (which can be any suitable type of hardware storage medium in which digital information can be stored and or retrieved), a processor 1613 (computer processor hardware), I/O interface 1614, and a communications interface 1617.

I/O interface(s) 1614 supports connectivity to repository 1680 and input resource 1692.

Computer readable storage medium 1612 can be any hardware storage device such as memory, optical storage, hard drive, floppy disk, etc. In one embodiment, the computer readable storage medium 1612 stores instructions and/or data.

As shown, computer readable storage media 1612 can be encoded with management application 140-1 (e.g., including instructions associated with any entity as discussed herein such as API gateway 1020, connection manager 140, link management resource 150, power management resource 151, power management resource 151-1, power management resource 151-2, power management resource 152, and so on) in a respective wireless station to carry out any of the operations as discussed herein.

During operation of one embodiment, processor 1613 accesses computer readable storage media 1612 via the use of interconnect 1611 in order to launch, run, execute, interpret or otherwise perform the instructions in management application 140-1 stored on computer readable storage medium 1612. Execution of the management application 140-1 produces management process 140-2 to carry out any of the operations and/or processes as discussed herein.

Those skilled in the art will understand that the computer system 1650 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1650 may reside at any location or can be included in any suitable resource in any network environment to implement functionality as discussed herein.

Functionality supported by the different resources will now be discussed via flowchart 1700 in FIG. 17. Note that the steps in the flowcharts below can be executed in any suitable order.

Figure 17:
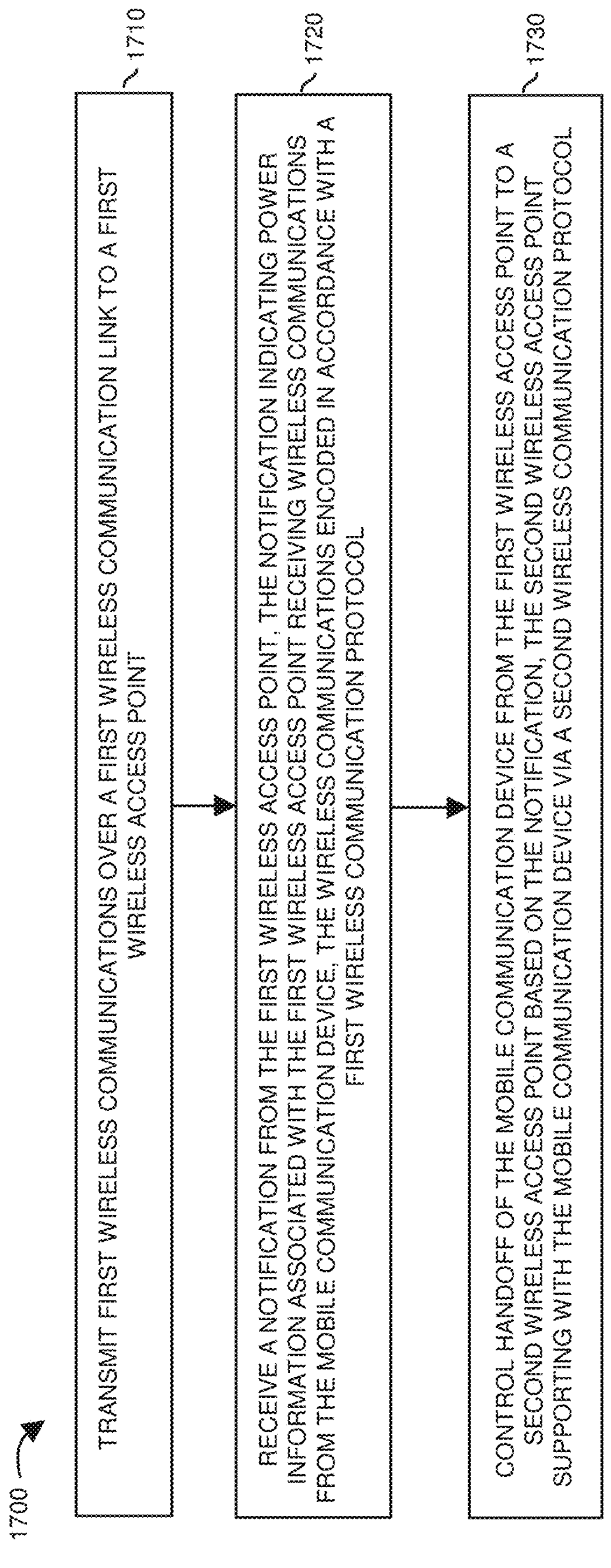
FIG. 17 is an example diagram illustrating a method as discussed herein.

FIG. 17 is a flowchart 1700 illustrating an example method according to embodiments herein. Note that there will be some overlap with respect to concepts as discussed above.

In processing operation 1710, a mobile communication device transmits first wireless communications over a first wireless communication link to a first wireless access point.

In processing operation 1720, the mobile communication device receives a notification from the first wireless access point. The notification indicates power information associated with the first wireless access point receiving wireless communications from the mobile communication device.

The wireless communications are encoded in accordance with a first wireless communication protocol.

In processing operation 1730, the mobile communication device control handoff of the mobile communication device from the first wireless access point to a second wireless access point based on the notification. The second wireless access point supports wireless connectivity with the mobile communication device via a second wireless communication protocol.

Note again that techniques herein are well suited to facilitate wireless connectivity in accordance with different available wireless services. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

via a mobile communication device:

transmitting first wireless communications in an uplink direction over a first wireless communication link from the mobile communication device to a first wireless access point via a first wireless communication protocol, wherein the first wireless communications are received by the first wireless access point at a first wireless power level as measured by the first wireless access point;

receiving an offset value indicating a difference between: i) the first wireless power level of the first wireless access point receiving the first wireless communications transmitted from the mobile communication device in the uplink direction, and ii) a second wireless power level of the mobile communication device receiving second wireless communications transmitted in a downlink direction from the first wireless access point to the mobile communication device; and controlling handoff of the mobile communication device from the first wireless access point to a second wireless access point based on the offset value.

2. The method as in claim 1, wherein the second wireless access point supports third wireless communications with the mobile communication device over a second wireless communication link via a second wireless communication protocol subsequent to the handoff.

3. The method as in claim 2 further comprising:

initiating the handoff of the mobile communication device from the first wireless access point to the second wireless access point in response to detecting that a magnitude of the first wireless power level being below a threshold level.

4. The method as in claim 1, wherein the first wireless communication protocol is a Wi-Fi™ communication protocol; and wherein the second wireless access point is a wireless base station residing in a cellular wireless network.

5. The method as in claim 1, wherein the first wireless communication link between the mobile communication device and the first wireless access point utilizes an unlicensed wireless bandwidth to support conveyance of the first wireless communications; and wherein, subsequent to the handoff, a second wireless communication link between the mobile communication device and the second wireless access point utilizes a licensed wireless bandwidth to support conveyance of third wireless communications between the mobile communication device and the second wireless access point.

6. The method as in claim 1 further comprising:

implementing a communication management function in the mobile communication device, the communication management function in communication with a power management resource to receive the offset value.

7. The method as in claim 6, wherein the power management resource resides at a disparate location with respect to the first wireless access point; and wherein the mobile communication device receives the offset value via a message transmitted from the power management resource through the first wireless access point to the mobile communication device.

8. The method as in claim 1 further comprising:

at the mobile communication device, estimating an uplink power level of the first wireless access point receiving the first wireless communications via the offset value and the second wireless power level of the mobile communication device receiving the second wireless communications from the first wireless access point.

9. The method as in claim 7, wherein the mobile communication device receives the offset value in response to a condition in which the offset value is below an offset threshold level.

10. The method as in claim 1 further comprising:

receiving the offset value in response to the mobile communication device calling, through the first wireless access point, an application programming interface at a server resource.

11. A system comprising:

a mobile communication device operative to:

transmit first wireless communications in an uplink direction over a first wireless communication link to a first wireless access point via a first wireless communication protocol;

receive an offset value indicating a difference between: i) a first wireless power level of the first wireless access point receiving the first wireless communications transmitted in the uplink direction from the mobile communication device over the first wireless communication link, the first wireless power level measured by the first wireless access point, and ii) a second wireless power level of the mobile communication device receiving downlink wireless signals transmitted from the first wireless access point to the mobile communication device, the second wireless power level measured by the mobile communication device;

control handoff of the mobile communication device from the first wireless access point to a second wireless access point based on the offset value.

12. The system as in claim 11, wherein the second wireless access point is operative to support third wireless communications with the mobile communication device via a second wireless communication protocol subsequent to the handoff.

13. The system as in claim 12, wherein the mobile communication device is further operative to: initiate the handoff of the mobile communication device from the first wireless access point to the second wireless access point in response to detecting that a magnitude of the first wireless power level is below a threshold level.

14. The system as in claim 11, wherein the first wireless communication link between the mobile communication device and the first wireless access point utilizes an unlicensed bandwidth to support conveyance of the first wireless communications; and wherein a second wireless communication link between the mobile communication device and the second wireless access point utilizes a licensed bandwidth to support conveyance of third wireless communications, the second wireless communication link established in response to the handoff.

15. The system as in claim 11, wherein the mobile communication device is further operative to:

estimate the first wireless power level of the first wireless access point receiving the first wireless communications via the offset value and the second wireless power level of the mobile communication device receiving the downlink wireless signals from the first wireless access point.

16. The system as in claim 15, wherein the mobile communication device receives the offset value in response to a condition in which the offset value is below a threshold level.

17. The system as in claim 11, wherein the mobile communication device is further operative to:

receive the offset value in response to the mobile communication device calling, through the first wireless access point, an application programming interface at a server resource.

18. The system as in claim 11, wherein the mobile communication device is further operative to:

transmit third wireless communications over a second wireless communication link to a third wireless access point;

receive second power level information, the second power level information received from the third wireless access point, the second power level information indicating a wireless power level of the third wireless access point receiving the third wireless communications transmitted from the mobile communication device in accordance with the first wireless communication protocol; and control handoff of the mobile communication device from the first wireless access point to the second wireless access point based on the offset value and the second power level information.

19. Computer-readable storage hardware having instructions stored thereon, the instructions, when executed by computer processor hardware, cause the computer processor hardware to support operations of:

transmit first wireless communications in an uplink direction from a mobile communication device over a first wireless communication link to a first wireless access point via a first wireless communication protocol;

receive an offset value indicating a difference between: i) a first wireless power level of the first wireless access point receiving the first wireless communications transmitted in the uplink direction from the mobile communication device over the first wireless communication link, the first wireless power level measured by the first wireless access point, and ii) a second wireless power level of the mobile communication device receiving downlink wireless signals transmitted from the first wireless access point to the mobile communication device, the second wireless power level measured by the mobile communication device; and control handoff of the mobile communication device from the first wireless access point to a second wireless access point based on the offset value.

20. The method as in claim 1, wherein the first wireless communication protocol supports conveyance of the first wireless communications over the first wireless communication link in accordance with an unlicensed wireless channel.

21. The method as in claim 1 further comprising:

receiving the offset value at the mobile communication device in response to the mobile communication device communicating with a remote server resource through the first wireless access point.

22. The method as in claim 1, wherein the first wireless communication link between the mobile communication device and the first wireless access point utilizes an unlicensed wireless bandwidth to support conveyance of the first wireless communications; and wherein, subsequent to the handoff, a second wireless communication link between the mobile communication device and the second wireless access point utilizes a licensed wireless bandwidth to support conveyance of third wireless communications between the mobile communication device and the second wireless access point.

23. The system as in claim 11, wherein the mobile communication device is further operative to:

transmit the second wireless power level in the uplink direction over the first wireless communication link prior to receiving the offset value.

24. The method as in claim 1 further comprising:

transmitting the second wireless power level in a message in the uplink direction over the first wireless communication link prior to receiving the offset value.

* * * * *